(No Model.)
N. E. SMITH.
PIPE PATCH.
No. 573,491.  Patented Dec. 22, 1896.
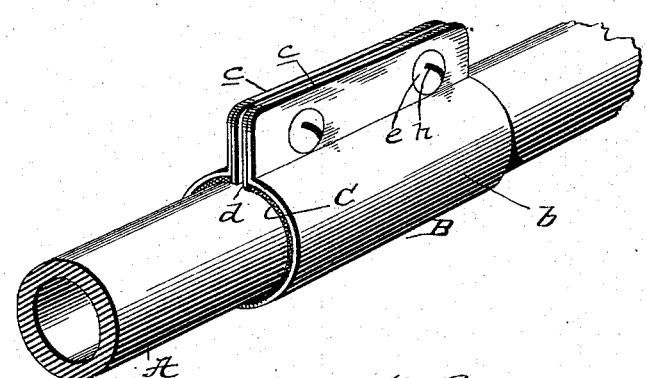
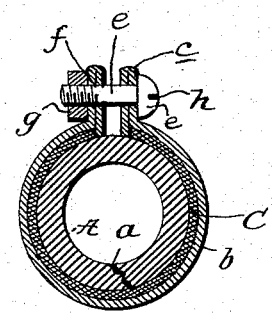
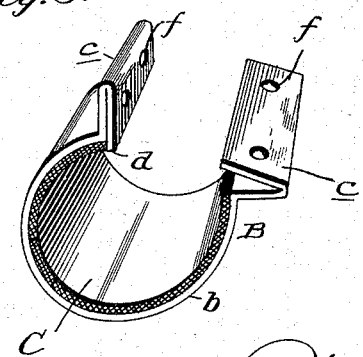
Witnesses:  
Inventor  
N. E. Smith  
By James Shuhy  
Attorney

UNITED STATES PATENT OFFICE.

NATHANIEL E. SMITH, OF JERSEY CITY, NEW JERSEY.

PIPE-PATCH.

SPECIFICATION forming part of Letters Patent No. 573,491, dated December 22, 1896.

Application filed September 12, 1896. Serial No. 605,663. (No model.)

*To all whom it may concern:*

Be it known that I, NATHANIEL E. SMITH, a citizen of the United States, residing at Jersey City, in the county of Hudson and State of New Jersey, have invented certain new and useful Improvements in Pipe-Patches; and I do declare the following to be a full, clear, and exact description of the invention, such as will enable others skilled in the art to which it appertains to make and use the same.

My invention relates to improvements in devices for closing or repairing leaks in pipes and the like; and it has for its general object to provide an exceedingly cheap and simple device which may be quickly and easily secured upon a pipe over an aperture or crack therein without the employment of skilled labor and without the necessity of disconnecting the pipe, and which is adapted, when properly secured upon the pipe, to effectually prevent leakage through the aperture or crack therein.

Other objects and advantages of the invention will be fully understood from the following description and claims when taken in conjunction with the annexed drawings, in which—

Figure 1 is a detail perspective view illustrating my improved device in its operative position upon a section of pipe. Fig. 2 is a transverse section of the same; and Fig. 3 is a perspective view illustrating the clamp-body of the device and the rubber packing therein, the layers of one of the lugs of said clamp-body being shown as spread apart to better illustrate the manner in which said lugs are formed.

In the said drawings similar letters designate corresponding parts in all of the views, referring to which—

A indicates a section of pipe cracked, as indicated at $a$, and B indicates the clamp-body of my improved repair device, which is preferably formed of sheet-brass or other suitable sheet metal, although it might be formed of soft brass or any other material that will permit of its ends being spread apart to enable it to receive a pipe. This clamp-body B has the circular portion $b$ designed to encompass a pipe, as better shown in Fig. 2, and lugs $c$ at the opposite ends of the circular portion, and it also has the longitudinal flanges $d$ at the opposite ends of the circular portion, which flanges project inwardly beyond the inner surface of the circular portion $b$, as shown, for a purpose presently described. The said clamp-body B is preferably of sheet metal, as stated, and of a single piece, and it is formed by first bending the intermediate portion of such piece to form the circular portion $b$ and then bending the end portions inwardly upon themselves to form the parallel or approximately parallel lugs $c$, such latter bends being made at such a point that the inner layers of the lugs will be of a greater width than their outer layers in order to form the flanges $d$, projected inwardly beyond the inner surface of the circular portion $b$, as shown.

The lugs $c$ may be connected together to tighten and secure the clamp-body upon a pipe by any suitable means. I have shown such connection as effected by threaded bolts $e$, which extend through apertures $f$ in the lugs and are provided with nuts $g$. The screws $e$ are provided with kerfs $h$, while the nuts $g$ are prevented from turning by the circular portion $b$, and it will therefore be seen that the device may be tightly secured without the employment of any implement other than a common screw-driver, which makes the connection illustrated and described highly desirable.

C indicates a piece of packing (preferably rubber) which is arranged within the clamp-body and is designed and adapted, when pressed and held against a pipe, to effectually close the crack or aperture therein. This piece of packing C is preferably of such a size as to entirely cover the inner surface of the circular portion $b$ of the clamp-body, and it abuts at its ends against the inwardly-projected flanges $d$ of the clamp-body, as better shown in Figs. 2 and 3. In virtue of this it will be observed that when the ends of the clamp-body are spread apart and the same is placed around a pipe the pipe cannot engage the ends of the piece of packing and curl or roll the same on the inner side of the circular portion $b$, but, on the other hand, said piece of packing is held against movement and smooth against the inner surface of the portion $b$ and against the pipe, so that when the clamp is tightened upon the pipe it will effectually close the crack or aperture therein.

To apply my device to a pipe which has cracked or sprung aleak, it is simply necessary to move the ends of the clamp-body B apart and place the same over the cracked or apertured portion of the pipe, as shown in Fig. 2, and then connect and draw the lugs *c* together, so as to tightly press and hold the packing C against the cracked or apertured portion of the pipe, when the crack or aperture will be tightly closed and leakage absolutely prevented. As will be readily appreciated, this application of the device to a pipe may be accomplished without removing the pipe from its connections and without the employment of skilled labor or any implement other than a screw-driver such as is found in every household.

It will also be observed from the foregoing that my improved device is very simple and easily manufactured, and that it may be therefore produced and sold with profit for a small price.

Having described my invention, what I claim is—

1. A device for closing leaks in pipes comprising a clamp having a circular portion adapted to receive a pipe and inwardly-directed flanges at the ends of said circular portion, and a piece of packing arranged within the circular portion of the clamp and abutting at its ends against the inwardly-directed flanges thereof, substantially as and for the purpose set forth.

2. A device for closing leaks in pipes comprising a clamp having a body formed in one piece and provided with a circular portion adapted to receive a pipe and outwardly-directed lugs and inwardly-directed flanges at the ends of the circular portion and means for connecting the lugs, and a piece of packing arranged within the circular portion of the clamp and abutting at its ends against the inwardly-directed flanges thereof, substantially as and for the purpose set forth.

3. The device described for closing leaks in pipes comprising the clamp having the body formed of a single piece of sheet metal curved to form a circular portion for the reception of a pipe and bent inwardly upon itself at the ends of the curved portion and having the inner layers of the lugs of greater width than the outer layers and forming inwardly-directed flanges, and means for connecting the lugs, and a piece of packing arranged within the circular portion of the clamp and abutting at its ends against the inwardly-directed flanges thereof, substantially as and for the purpose set forth.

In testimony whereof I affix my signature in presence of two witnesses.

NATHANIEL E. SMITH.

Witnesses:
ROBERT P. SMITH,
ALIDA LAPPIN.